(12) United States Patent
El Jabri

(10) Patent No.: US 12,381,996 B1
(45) Date of Patent: Aug. 5, 2025

(54) SYSTEMS AND METHODS FOR FRAMING VIDEOS

(71) Applicant: GoPro, Inc., San Mateo, CA (US)

(72) Inventor: Mejed El Jabri, Paris (FR)

(73) Assignee: GoPro, Inc., San Mateo, CA (US)

( * ) Notice: Subject to any disclaimer, the term of this patent is extended or adjusted under 35 U.S.C. 154(b) by 62 days.

(21) Appl. No.: 18/394,460

(22) Filed: Dec. 22, 2023

(51) Int. Cl.
 *H04N 23/698* (2023.01)
 *G06T 7/70* (2017.01)
 *H04N 5/262* (2006.01)

(52) U.S. Cl.
 CPC ............. *H04N 5/2628* (2013.01); *G06T 7/70* (2017.01); *H04N 23/698* (2023.01); *G06T 2207/10016* (2013.01); *G06T 2207/30201* (2013.01)

(58) Field of Classification Search
 CPC ...... H04N 5/2628; H04N 23/698; G06T 7/70; G06T 2207/10016; G06T 2207/30201
 See application file for complete search history.

(56) References Cited

U.S. PATENT DOCUMENTS

| 10,248,866 | B1 * | 4/2019 | Cotoros | ................. | G06V 40/19 |
| 10,917,565 | B1 * | 2/2021 | Gilmour | ............ | G06F 9/30003 |
| 2020/0075057 | A1 * | 3/2020 | Clark | .................. | H04N 13/106 |

* cited by examiner

*Primary Examiner* — Thai Q Tran
*Assistant Examiner* — Jose M Mesa
(74) *Attorney, Agent, or Firm* — Esplin & Associates, PC

(57) ABSTRACT

A spherical video depicting a scene including one or more human subjects is obtained. Gaze direction(s) of the human subjects are used to determine how the spherical video will be framed for presentation. Based on the gaze direction(s) passing through a center of the spherical video, the spherical video is framed to include the spatial extent that depicts the human subject(s). Based on the gaze direction(s) not passing through the center of the spherical video, the spherical video is framed to include the spatial extent that depicts a portion of the scene looked at by the human subject(s).

20 Claims, 5 Drawing Sheets

SYSTEMS AND METHODS FOR FRAMING VIDEOS

FIELD

This disclosure relates to framing videos based on the gaze of people depicted within the videos.

BACKGROUND

A video may have a wide field of view (e.g., spherical field of view). The wide field of view of the video may make it difficult to determine which parts (spatial extents) of the video contain interesting views. Manually reviewing the video to determine framing of the video may be difficult and time consuming.

SUMMARY

This disclosure relates to framing videos. Video information and/or other information may be obtained. The video information may define a spherical video. The spherical video may have a progress length. The spherical video may include spherical visual content viewable as a function of progress through the progress length. The spherical visual content may depict a scene including a human subject. A gaze direction of the human subject depicted within the spherical visual content may be determined. Whether the gaze direction of the human subject passes through a center of the spherical visual content may be determined. Responsive to the gaze direction of the human subject passing through the center of the spherical visual content, a viewing window for the spherical visual content may be positioned to include an extent of the spherical visual content that depict the human subject. Responsive to the gaze direction of the human subject not passing through the center of the spherical visual content, the viewing window for the spherical visual content may be positioned to include an extent of the spherical visual content that depict a portion of the scene looked at by the human subject. Presentation of the spherical visual content on an electrical display based on the viewing window and/or other information may be effectuated.

A system for framing videos may include one or more electronic storages, one or more processors, and/or other components. An electronic storage may store video information, information relating to videos, information relating to visual content, information relating to human subjects, information relating to gaze directions, information relating to viewing windows, and/or other information.

The processor(s) may be configured by machine-readable instructions. Executing the machine-readable instructions may cause the processor(s) to facilitate framing videos. The machine-readable instructions may include one or more computer program components. The computer program components may include one or more of a video component, a gaze direction component, a center component, a viewing window component, a presentation component, and/or other computer program components.

The video component may be configured to obtain video information and/or other information. The video information may define a spherical video. The spherical video may have a progress length. The spherical video may include spherical visual content viewable as a function of progress through the progress length. The spherical visual content may depict a scene including a human subject. In some implementations, the spherical visual content may depict multiple human subjects.

The gaze direction component may be configured to determine a gaze direction of the human subject depicted within the spherical visual content.

The center component may be configured to determine whether the gaze direction of the human subject passes through a center of the spherical visual content.

The viewing window component may be configured to position a viewing window for the spherical visual content. Responsive to the gaze direction of the human subject passing through the center of the spherical visual content, the viewing window for the spherical visual content may be positioned to include an extent of the spherical visual content that depicts the human subject. Responsive to the gaze direction of the human subject not passing through the center of the spherical visual content, the viewing window for the spherical visual content may be positioned to include an extent of the spherical visual content that depicts a portion of the scene looked at by the human subject.

In some implementations, the portion of the scene looked at by the human subject may be determined based location of a head/face of the human subject depicted within the spherical visual content, the gaze direction of the human subject, and/or other information. The location of the head/face of the human subject depicted within the spherical visual content may be defined by a horizontal location angle and a vertical location angle. The gaze direction of the human subject may be defined by a horizontal gaze angle and a vertical gaze angle. The portion of the scene looked at by the human subject may be determined based on the horizontal location angle, the vertical location angle, the horizontal gaze angle, the vertical gaze angle, and/or other information.

In some implementations, responsive to a threshold number of gaze directions of the multiple human subjects converging to a point or a region on the spherical visual content, the viewing window for the spherical visual content may be positioned to include an extent of the spherical visual content that depicts a portion of the scene including the point or the region on the spherical visual content.

In some implementations, wherein responsive to the threshold number of gaze directions of the multiple human subjects not converging to the point or the region on the spherical visual content, the viewing window for the spherical visual content may be positioned to include an extent of the spherical visual content that depicts the multiple human subjects.

In some implementations, the threshold number may include a majority of the multiple human subjects. In some implementations, the threshold number may include a plurality of the multiple human subjects.

The presentation component may be configured to effectuate presentation of the spherical visual content on an electrical display. The presentation of the spherical visual content may be effectuated based on the viewing window and/or other information.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
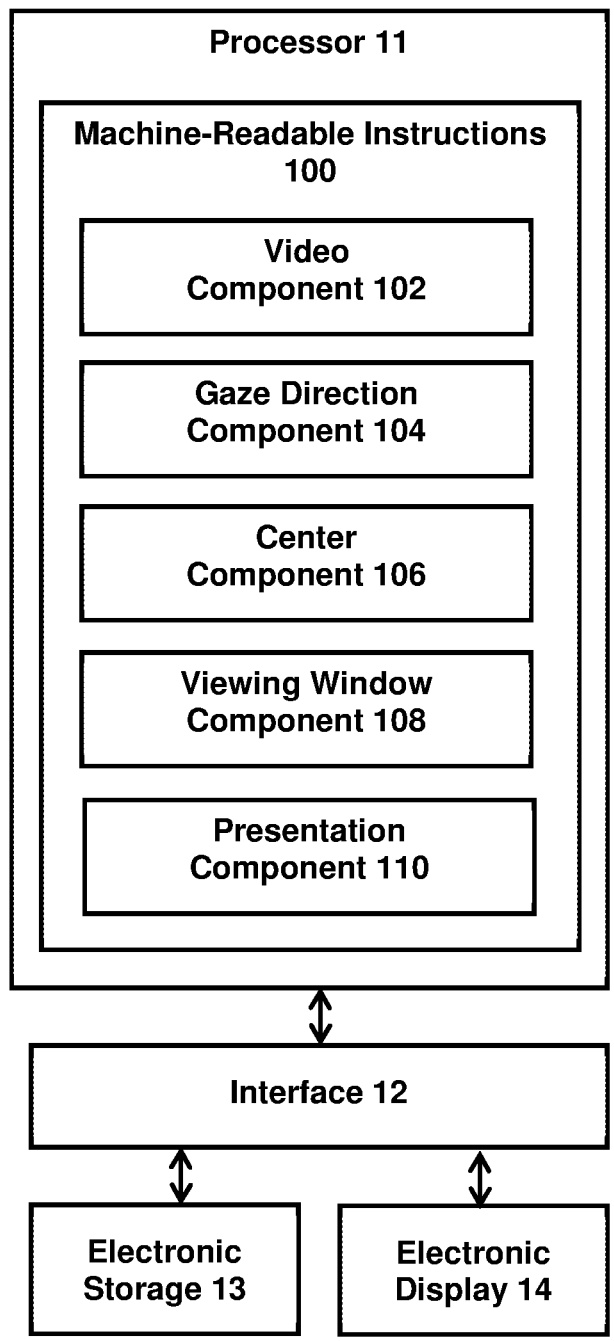
FIG. 1 illustrates an example system for framing videos.

FIG. 1 illustrates a system 10 for presenting framing videos. The system 10 may include one or more of a processor 11, an interface 12 (e.g., bus, wireless interface), an electronic storage 13, an electronic display 14, and/or other components. Video information and/or other information may be obtained by the processor 11. The video information may define a spherical video. The spherical video may have a progress length. The spherical video may include spherical visual content viewable as a function of progress through the progress length. The spherical visual content may depict a scene including a human subject. A gaze direction of the human subject depicted within the spherical visual content may be determined by the processor 11. Whether the gaze direction of the human subject passes through a center of the spherical visual content may be determined by the processor 11. Responsive to the gaze direction of the human subject passing through the center of the spherical visual content, a viewing window for the spherical visual content may be positioned by the processor 11 to include an extent of the spherical visual content that depict the human subject. Responsive to the gaze direction of the human subject not passing through the center of the spherical visual content, the viewing window for the spherical visual content may be positioned by the processor 11 to include an extent of the spherical visual content that depict a portion of the scene looked at by the human subject. Presentation of the spherical visual content on an electrical display based on the viewing window and/or other information may be effectuated by the processor 11.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store video information, information relating to videos, information relating to visual content, information relating to human subjects, information relating to gaze directions, information relating to viewing windows, and/or other information.

The electronic display 14 may refer to an electronic device that provides visual presentation of information. The electronic display 14 may include a color display and/or a non-color display. The electronic display 14 may be configured to visually present information. The electronic display 14 may present information using/within one or more graphical user interfaces. For example, the electronic display 14 may present video information, information relating to videos, information relating to visual content, information relating to human subjects, information relating to gaze directions, information relating to viewing windows, and/or other information.

In some implementations, the electronic display 14 may include a touchscreen display. A touchscreen display may be configured to receive user input via a user's engagement with the touchscreen display. A user may engage with the touchscreen display via interaction with one or more touch-sensitive surfaces/screens and/or other components of the touchscreen display. The electronic display 14 may be a standalone device or a component of a computing device, such as an electronic display of a mobile device (e.g., camera, smartphone, smartwatch, tablet, laptop) or a desktop device (e.g., monitor). User interaction with elements of graphical user interface(s) may be received through the electronic display (e.g., touchscreen display) and/or other user interface devices (e.g., keyboard, mouse, trackpad).

Visual content may refer to content of image(s), video frame(s), and/or video(s) that may be consumed visually. For example, visual content may be included within one or more images and/or one or more video frames of a video. The video frame(s) may define/contain the visual content of the video. The video may include video frame(s) that define/contain the visual content of the video. Video frame(s) may define/contain visual content viewable as a function of progress through the progress length of the video content. A video frame may include an image of the video content at a moment within the progress length of the video. As used herein, the term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files. In some implementations, visual information may be stored within one or more visual tracks of a video.

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, the processor 11, the interface 12, the electronic storage 13, and/or the electronic display 14 of the system 10 may be carried by the housing of the image capture device. The image capture device may carry other components, such as one or more optical elements and/or one or more image sensors.

An image capture device may refer to a device that captures visual content. An image capture device may capture visual content in the form of images, videos, and/or other forms. An image capture device may refer to a device for recording visual information in the form of images, videos, and/or other media. An image capture device may be a standalone device (e.g., camera, image sensor) or may be part of another device (e.g., part of a smartphone, tablet).

A video with a wide field of view (e.g., spherical video, panoramic video) may depict a large portion of a scene. The wide field of view of the video may make it difficult for a user to determine which spatial extent of the scene depicted within the video contains an interviewing view. When the user is viewing a particular extent of the video, the user may not know what is going on in other extents of the video. The user may not know when the direction and/or the size of view should be changed. The user may not know in what direction the view should be changed and/or whether the view should be made smaller or larger.

The present disclosure enables automatic framing of a spherical video based on gaze directions of people depicted within the spherical video. A spherical video depicting a scene including one or more human subjects is obtained. Gaze direction(s) of the human subjects are used to determine how the spherical video will be framed for presentation. Based on the gaze direction(s) passing through a center of the spherical video, the spherical video is framed to include the spatial extent that depicts the human subject(s). Based on the gaze direction(s) not passing through the center of the spherical video, the spherical video is framed to include the spatial extent that depicts a portion of the scene looked at by the human subject(s).

The present disclosure enables a view of spherical video to automatically include the portions of the scene looked at by one or more human subjects during capture of the spherical video. To frame a spherical video using the gaze of a single human subject, when the human subject is looking at a particular position of the scene, the view of the spherical video may be set to include the portion of the scene looked at by the human subject (target view). When the human subject is looking at the image capture device capturing the spherical video, the view of the spherical video may be set to include the human subject (selfie view). To frame a spherical video using the gaze of multiple human subjects, when the human subjects are looking at a particular portion of the scene, their gaze may converge to the portion (to a point/region of the spherical video) and the view of the spherical video may be set to include the portion of the scene looked at by the human subjects (target view). When the human subjects are looking at the image capture device capturing the spherical video, their gaze may converge on the image capture device (to the center of the spherical video) and the view of the spherical video may be set to include the human subjects (selfie view). If the gaze of the human subject(s) changes during the video, the view of the spherical video may automatically switch between the target view and the selfie view. Moments in the spherical video when gaze of multiple human subject converge may be used as highlight moments for inclusion in a presentation and/or a video clip (video summary/video edit). The gaze of human subjects depicted within the spherical video may be used to determine both where and when something of interest is depicted within the spherical video. The gaze of human subjects depicted within the spherical video may be used to automatically edit and frame/reframe the spherical video.

Figure 3A:
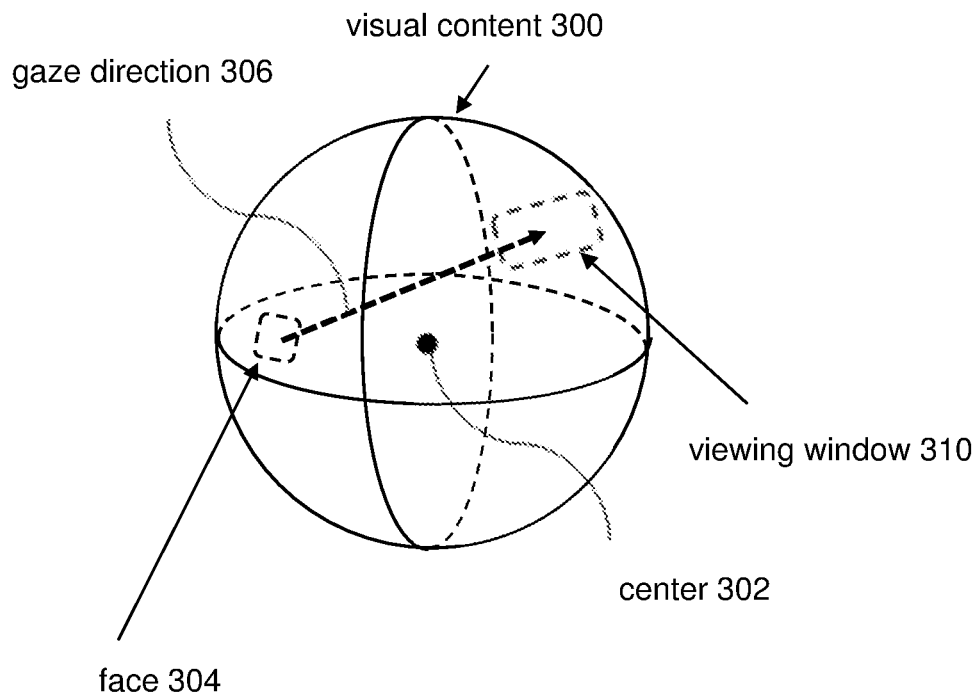
FIG. 3A illustrates an example framing of a video.

FIG. 3A illustrates an example framing of a video. The video may include visual content 300 having a spherical field of view. A face 304 of a person may be depicted within the visual content 300. A gaze direction 306 of the person may be determined to be pointed at the opposite side of the visual content 300. The gaze direction 306 may not pass through a center 302 of the visual content 300. Responsive to the gaze direction 306 not passing through the center 302 of the visual content 300, a viewing window 310 may be positioned to include an extent of the visual content 300 looked at by the person.

Figure 3B:
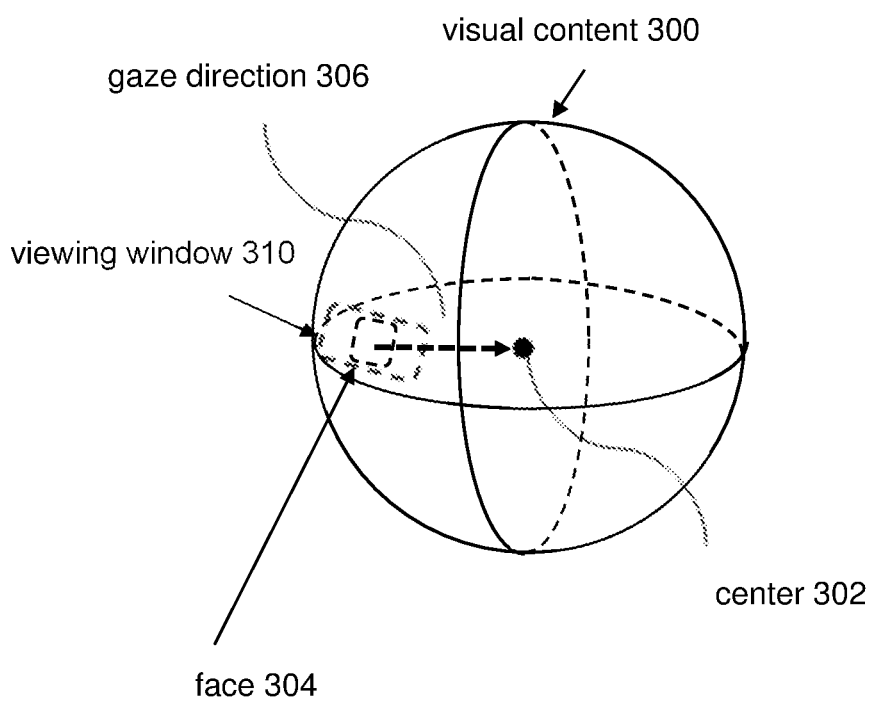
FIG. 3B illustrates an example framing of a video.

FIG. 3B illustrates an example framing of a video. In FIG. 3B, the gaze direction 306 of the person may pass through the center 302 of the visual content. The gaze direction 306 of the person may be directed at the image capture device that captured the visual content 300. Responsive to the gaze direction 306 passing through the center 302 of the visual content 300, the viewing window 310 may be positioned to include an extent of the visual content 300 that depicts the person. For example, the viewing window 310 may be positioned to include the face 304 of the person. As another example, the viewing window 310 may be positioned to include the entirety of the person. Such automatic positioning of viewing window may result in the presentation of the spherical video switching between (1) things looked at by the person when the person is not looking at the image capture device and (2) the person when the person is looking at the image capture device.

Similarly, the gaze of multiple persons may be used to automatically change the position of viewing window to change between presenting (1) things looked at by the multiple persons and (2) multiple persons. For example, responsive to a threshold number of gaze of people depicted within the spherical video converging to a point/region on the visual content, the viewing window may be positioned to include an extent of the visual content that depicts the portion of the scene looked at by the people whose gaze converge. Responsive to a threshold number of gaze of people depicted within the spherical video passing through the center of the visual content, the viewing window may be positioned to include an extent of the visual content that depicts the people whose gaze pass through the center of visual content (people looking at the image capture device). Responsive to a threshold number of gaze of people depicted within the spherical video not converging to a point/region on the visual content, the viewing window may be positioned to include an extent of the visual content that depicts the people. Such automatic positioning of viewing window may result in the presentation of the spherical video switching between (1) thing looked at by the people when a threshold number of people are looking at the same thing, (2) people looking at the image capture device when a threshold number of people are looking at the image capture device, and (3) people when there is no convergence of people's gaze.

Referring back to FIG. 1, the processor 11 (or one or more components of the processor 11) may be configured to obtain information to facilitate framing videos. Obtaining information may include one or more of accessing, acquiring, analyzing, capturing, determining, examining, generating, identifying, loading, locating, opening, receiving, retrieving, reviewing, selecting, storing, and/or otherwise obtaining the information. The processor 11 may obtain information from one or more locations. For example, the processor 11 may obtain information from a storage location, such as the electronic storage 13, electronic storage of information and/or signals generated by one or more sensors, electronic storage of a device accessible via a network, and/or other locations. The processor 11 may obtain information from one or more hardware components (e.g., an image sensor) and/or one or more software components (e.g., software running on a computing device).

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate framing videos. The machine-readable instructions 100 may include one or more computer program components. The machine-readable instructions 100 may include one or more of a video component 102, a gaze direction component 104, a center component 106, a viewing window component 108, a presentation component 110, and/or other computer program components.

The video component 102 may be configured to obtain video information and/or other information. In some implementations, the video information component 102 may obtain video information based on user interaction with a user interface/application (e.g., video editing application, video player application), and/or other information. For example, a user interface/application may provide option(s) for a user to play and/or edit videos. The video information for a video may be obtained based on the user's selection of the video through the user interface/video application. Other selections of a video for retrieval of video information are contemplated.

The video information may define a video. The video may have a progress length. The progress length of a video may be defined in terms of time durations and/or frame numbers. For example, a video may have a time duration of 60 seconds. A video may have 1800 video frames. A video having 1800 video frames may have a play time duration of 60 seconds when viewed at 30 frames per second. Other progress lengths, time durations, and frame numbers of videos are contemplated.

The video may include visual content viewable as a function of progress through the progress length of the video. The visual content may have a field of view. A field of view of a video/visual content may refer to a field of view of a scene captured within the video/visual content (e.g., within video frames). A field of view of a video/visual content may refer to the extent of a scene that is captured within the video/visual content.

A video may include a wide field of view video. A wide field of view video may refer to a video with a wide field of view. A wide field of view may refer to a field of view that is larger/wider than a threshold field of view/angle. For example, a wide field of view may refer to a field of view that is larger/wider than 60-degrees. In some implementations, a wide field of view video may include a spherical video having a spherical field of view. Spherical field of view may include 360-degrees of capture. Spherical field of view may include views in all directions surrounding the image capture device. The spherical video may include spherical visual content (visual content having spherical field of view) viewable as a function of progress through the progress length of the video. Spherical field of view may include a complete sphere or a partial sphere. Other fields of view of videos are contemplated. A wide field of view video may include and/or may be associated with spatial audio.

The visual content may depict a scene including one or more human subjects. The human subjects may have looked at the image capture device capturing the visual content and/or other parts of the scene around the human subjects during the capture of the visual content by the image capture device. Gaze directions of human subjected depicted within a video may be used to determine which spatial extents of the video are included in a video presentation (e.g., in a view of the video presented on the electronic display 14; in a video edit/summary generation for the video).

The video information may define a video by including information that defines one or more content, qualities, attributes, features, and/or other aspects of the video/video content. For example, the video information may define video content by including information that makes up the content of the video and/or information that is used to determine the content of the video. For instance, the video information may include information that makes up and/or is used to determine the arrangement of pixels, characteristics of pixels, values of pixels, and/or other aspects of pixels that define visual content of the video. The video information may include information that makes up and/or is used to determine audio content of the video. Other types of video information are contemplated.

Video information may be stored within a single file or multiple files. For example, video information defining a video may be stored within a video file, multiple video files, a combination of different files (e.g., a visual file and an audio file), and/or other files. Video information may be stored in one or more formats or containers.

The gaze direction component 104 may be configured to determine the gaze direction(s) of the human subject(s) depicted within the visual content of the video. The gaze direction component 104 may be configured to determine the gaze direction(s) of the human subject(s) depicted within the spherical visual content of the spherical video. Determining a gaze direction of a human subject may include ascertaining, calculating, computing, establishing, finding, setting, and/or otherwise determining the gaze direction of the human subject. A gaze direction of a human subject may refer to a direction in which the human subject is looking. A gaze direction of a human subject may refer to the direction in which the head/face and/or the eyes of the human subject are pointed. Determining a gaze direction of a human subject may include (1) determining the location of the human subject's head/face in the visual content, and (2) determining where the gaze of the human subject is directed from the location of the human subject's head/face in the visual content. The location of the head/face may be determined as angular positions (e.g., horizontal (u) and vertical (v) angles/coordinates of where the head/face is located) plus angular size (h) (e.g., angular size of the head/face, size of a bounding box containing head/face). In some implementations, different types of eye movement may be treated differently in determining the gaze direction of the human subjects. For example, saccades, smooth pursuits, or fixation of eyes may be treated differently in determining the gaze direction of the human subject.

In some implementations, a gaze direction of a human subject may be determined based on analysis of the visual content. Analysis of the visual content may include examination, evaluation, processing, studying, and/or other analysis of the visual content. For example, analysis of the visual content may include examination, evaluation, processing, studying, and/or other analysis of one or more visual features/characteristics of the visual content. Analysis of the visual content may include analysis of visual content of a single image/video frame and/or analysis of visual content of multiple images/video frames. For example, a gaze direction of a human subject may be determined based on analysis of the human's subject's head/face, eyes, and/or other features/characteristics of the human subject. Analysis of the visual content may utilize traditional approaches (e.g., pixel-based analysis, feature-based analysis, and/or calibme) and/or deep learning approaches (e.g., GazeNet, Spatial Weight CNN, Pinball LSTM, RITnet, Pictorial Gaze, iTracker, Ize-Net, OpenCV) to determine the gaze direction. In some implementations, determination of a gaze direction of a human subject may include head/face detection, followed by eye gaze estimation. Different projections of the visual content may be used between head/face detection and eye gaze estimation. For example, head/face detection may be performed in the sphere, and then the visual content may be projected onto a two-dimensional plane using equirectangular projection for the eye gaze estimation. Other determinations of the gaze direction(s) of the human subject(s) depicted within the visual content of the video are contemplated.

Figure 4:
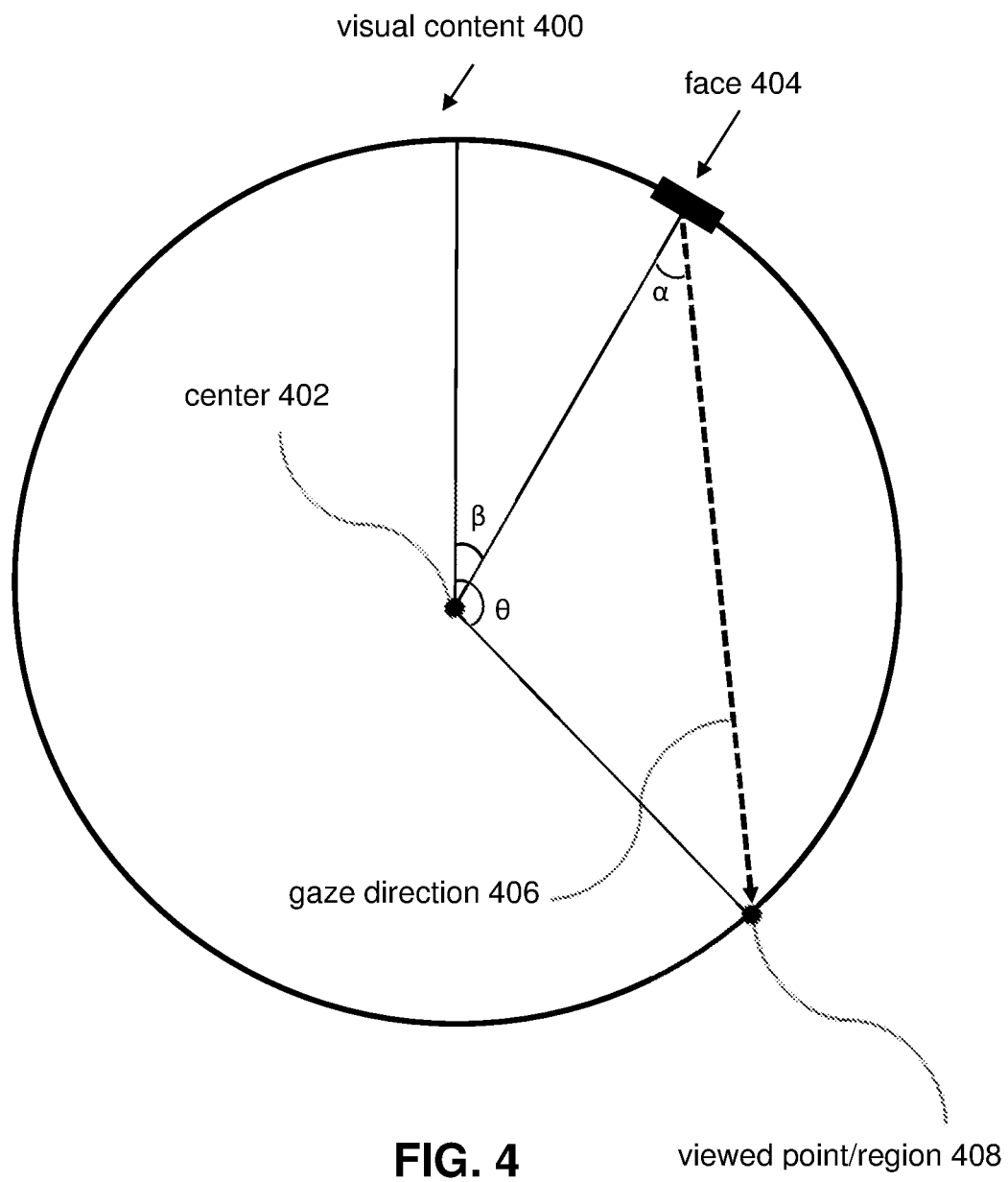
FIG. 4 illustrates an example gaze direction.

FIG. 4 illustrates an example gaze direction. FIG. 4 may show a view projection into the horizontal plane. The u coordinate may range between degrees of 0 and 360. Visual content 400 may have a spherical field of view. The visual content 400 may have a center 402. The visual content 400 may depict a human subject. Determination of the gaze direction of the human subject may include (1) determination of the location of a face 404 of the human subject depicted within the visual content 400, and (2) determining where the gaze of the human subject is directed from the location of the face 404 in the visual content—the angle α of a gaze direction 406 from the normal of the face 404. From the face detection, the angle β of the face 404 from the center 402 of the sphere may be determined. The portion of the scene looked at by the human subject (viewed point/region 408) may be determined as angle θ. The angle θ may be determined based on the two angles α and β, using the following relationship: $\theta=180+\beta-2\alpha$. Same calculation may be performed for the v coordinate of the spherical visual content. The v coordinate may range between degrees of 0 and 180. The horizontal and vertical coordinates/angels determined using the above may be used to determine (1) whether the gaze direction(s) of human subject passes through the center of the spherical visual content and (2) which spatial extents of the spherical visual content will be included in the presentation of the spherical visual content.

Figure 5:
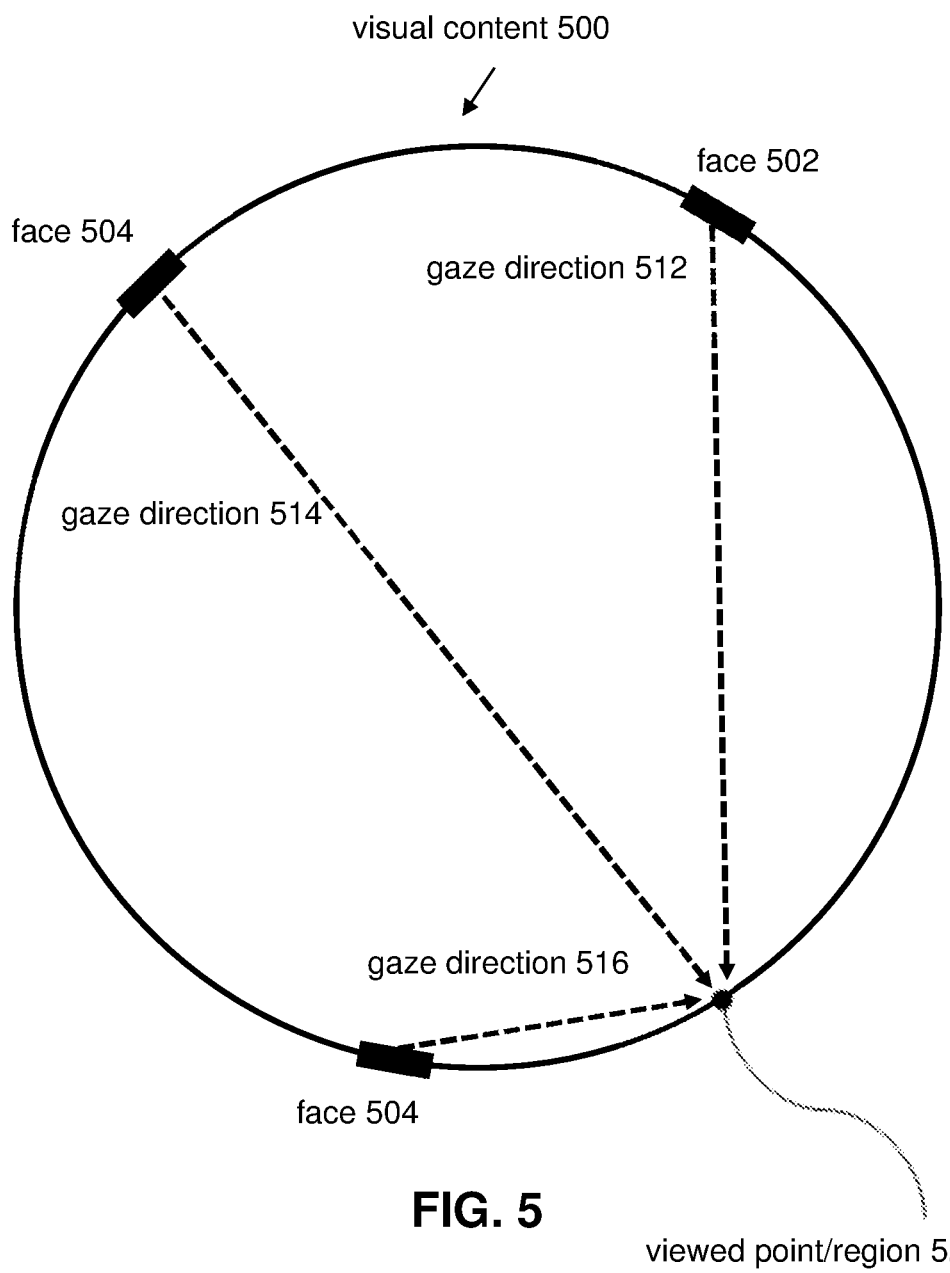
FIG. 5 illustrates example gaze directions.

FIG. 5 illustrates example gaze directions. FIG. 4 may show a view projection into the horizontal plane. Visual content 500 may have a spherical field of view. The visual content 500 may depict three human subjects. The locations of faces 502, 504, 506 of the human subjects and the relative eye directions of the human subjects from the faces 502, 504, 506 may be used to determine gaze directions 512, 514, 516 of the human subjects. The gaze directions 512, 514, 516 of the human subjects may converge on a viewed point/region 520. The gaze directions 512, 514, 516 of the human subjects may converge on the viewed point/region 520 based on the gaze directions 512, 514, 516 being directed at the same point/region of the visual content 500. The gaze directions 512, 514, 516 of the human subjects may converge on the viewed point/region 520 based on the gaze directions 512, 514, 516 being within a threshold angle of each other. The viewed point/region 520 may include one or more pixels. The viewed point/region 520 may be a specific point/pixel or an area/grouping of pixels.

The center component 106 may be configured to determine whether the gaze direction(s) of the human subject(s) passes through the center of the visual content (e.g., spherical visual content). A gaze direction of a human subject may pass through the center of the visual content based on the human subject having looked at the image capture device that captured visual content during the visual content capture. Determining whether a gaze direction of a human subject passes through the center of the visual content may include ascertaining, calculating, computing, deciding, establishing, finding, and/or otherwise determining the whether the gaze direction of the human subject passes through the center of the visual content. Determining whether a gaze direction of a human subject passes through the center of the visual content may include determining whether the gaze direction of the human subjected is directed towards the center of the visual content or away from the center of the visual content. Determining whether a gaze direction of a human subject passes through the center of the visual content may include determining the angle by which the gaze direction of the human subject deviates from the center of the visual content. A gaze direction of a human subject may be determined to pass through the center of the visual content based on the gaze direction of the human subject being directed at the center of the visual content. A gaze direction of a human subject may be determined to pass through the center of the visual content based on the gaze direction of the human subject being within a threshold angle of the center of the visual content. The vertical and horizontal components of a gaze direction of a human subject may be used to determine whether the gaze direction of the human subject passes through the center of the visual content. For example, a gaze direction of a human subject may be determined to pass through the center of the visual content based on the angle α (shown in FIG. 4) of the vertical and horizontal components of the gaze direction being zero or less than a threshold angle. The threshold angle for the vertical and horizontal components of the gaze direction may be the same or different.

The center component 106 may be configured to determine whether the gaze direction(s) of the human subject(s) passes through the center of the visual content as the function of progress through the progress length of the video. The center component 106 may be configured to determine whether and how the gaze direction(s) of the human subject(s) changes through the progress length of the video. The center component 106 may be configured to determine when within the progress length of the video the gaze direction(s) of the human subject(s) passes through the center of the visual content.

The viewing window component 108 may be configured to position one or more viewing windows for the visual content (e.g., spherical visual content). The viewing window component 108 may be configured to position a viewing window within the field of view of the visual content. The positioning of a viewing window within the field of view of the visual content may define framing of the visual content. The positioning of a viewing window within the field of view of the visual content may define how the visual content is framed for presentation.

Positioning of a viewing window within the field of view of the visual content may refer to placement of the viewing window within the field of view of the visual content. The positioning/placement of the viewing window may be defined by one or more of viewing direction, viewing size, viewing rotation, and/or other information. A viewing direction may define a direction of view for a viewing window. A viewing direction may define the angle/visual portion of the visual content at which a viewing window may be directed. A viewing size may define the size of the viewing window. A viewing size may define a size (e.g., size, magnification, viewing angle) of viewable extents of visual content within the viewing window. A viewing size may define the dimension/shape of the viewing window. A viewing rotation may define a rotation of the viewing window. A viewing rotation may define one or more rotations of the viewing window about one or more axis.

A viewing window may define the extents of the visual content to be included within a presentation of the video. A viewing window may define extents of the visual content to be included within a punchout of the visual content. A punchout of visual content may refer to an output of one or more portions of the visual content for presentation (e.g., current presentation, future presentation based on video generated using the punchout). A punchout of the visual content may refer to extents of the visual content that is obtained for viewing and/or extraction. The extents of the visual content viewable/extracted within the viewing window may be used to provide views of different spatial parts of the visual content.

A punchout of visual content may include output of a virtual camera. A virtual camera may define one or more spatial extents of the visual content to be output (e.g., for presentation, for storage) based on orientation of the virtual camera with respect to the visual content of the video. A virtual camera may represent the point of view from which different spatial extents of the visual content are observed. Different punchouts of the visual content may include outputs of different virtual cameras to provide views of differential spatial parts of the visual content.

A viewing window for the visual content may be positioned within the field of view of the visual content based on whether or not the gaze direction(s) of the human subject(s) passes through the center of the visual content. A viewing window for the visual content may be positioned differently based on whether or not the gaze direction(s) of the human subject(s) passes through the center of the visual content.

Responsive to the gaze direction(s) of the human subject(s) passing through the center of the visual content (e.g., spherical visual content), a viewing window for the visual content may be positioned to include an extent of the visual content that depicts the human subject(s). The gaze direction(s) of the human subject(s) passing through the center of the visual content may indicate that the human subject(s) are looking at the image capture device during video capture. In such moments, the video may be framed to provide a selfie view of the human subject(s). For example, a viewing window may be centered on all of the human subjects. A viewing window may be centered on the human subjects whose gaze directions are passing through the center of the visual content.

For a video depicting a single human subject, a viewing window may be positioned to include an extent of the visual content that depicts a part of the human subject or the entirety of the human subject when the gaze of the single human subject is passing through the center of the visual content. For a video depicting multiple human subjects, a viewing window may be positioned to include an extent of the visual content that depicts some or all of the human subjects when the gaze of a threshold number of human subjects are passing through the center of the visual content. For example, a viewing window may be positioned to include an extent of the visual content that depicts some or all of the human subjects when the gaze of a majority (more than half) or a plurality (more number of human subjects than those whose gaze converge on other parts of the visual content) of the human subjects are passing through the center of the visual content.

Responsive to the gaze direction(s) of the human subject(s) not passing through the center of the visual content (e.g., spherical visual content), a viewing window for the visual content may be positioned to include one or more extents of the visual content that depicts one or more portions of the scene looked at by the human subject(s). The gaze direction(s) of the human subject(s) not passing through the center of the visual content may indicate that the human subject(s) are not looking at the image capture device during video capture, but are looking at one or more portions of the scene in which the human subject(s) are located. In such moments, the video may be framed to provide a target view of the human subject(s). For example, a viewing window may be centered on the portion of the scene looked at by the human subject(s). For example, a viewing window may be centered on the portion of the scene looked at by most of the human subject(s).

For a video depicting a single human subject, a viewing window may be positioned to include an extent of the visual content that depicts a portion of the scene looked at by the human subject when the gaze of the single human subject is not passing through the center of the visual content. For a video depicting multiple human subjects, a viewing window may be positioned to include an extent of the visual content that depicts portion of the scene looked at by multiple human subjects when the gaze of the multiple human subject are not passing through the center of the visual content. For example, responsive to a threshold number (e.g., majority, plurality) of gaze directions of multiple human subjects converging to a point or a region on the visual content, the viewing window for the visual content may be positioned to include an extent of the visual content that depicts a portion of the scene including the point or the region on the visual content. For instance, if the majority/plurality of human subjects are looking at a particular object in the scene, the viewing window may be positioned to include a part of the object or the entirety of the object.

In some implementations, a portion of the scene looked at by a human subject may be determined based location of a head/face of the human subject depicted within the visual content, the gaze direction of the human subject, and/or other information. The location of the head/face of the human subject depicted within the visual content may be defined by a horizontal location angle and a vertical location angle. The gaze direction of the human subject may be defined by a horizontal gaze angle and a vertical gaze angle. The portion of the scene looked at by the human subject may be determined based on the horizontal location angle, the vertical location angle, the horizontal gaze angle, the vertical gaze angle, and/or other information. For example, the horizontal location angle, the vertical location angle, the horizontal gaze angle, the vertical gaze angle, and/or the portion of the scene looked at by the human subject may be determined as described with respect to FIGS. 4 and 5.

In some implementations, wherein responsive to a threshold number (e.g., majority, plurality) of gaze directions of multiple human subjects not converging to a point or a region on the visual content, the viewing window for the visual content may be positioned to include an extent of the visual content that depicts the multiple human subjects. Based on insufficient number of the gaze of human subjects converging to a point/region on the visual content, the video may be framed to provide a selfie view of the human subjects.

The positioning of a viewing window may change over the progress length of the video based on changes in the gaze direction(s) of the human subjects. For example, the positioning of a viewing window may change between providing a target view and a selfie view based on changes in the gaze of the human subject(s) between passing and not passing through the center of the visual content. In some implementations, changes in the gaze direction(s) of the human subjects may be smoothed or otherwise modified to prevent erratic changes in the positioning of the viewing window. For example, a gaze direction that does not stay fixed for a threshold duration of time may be disregarded for the positioning of the viewing window.

In some implementations, gaze directions of different human subjects may be weighed the same for the positioning of the viewing window. In some implementations, gaze directions of different human subjects may be weighed differently for the positioning of the viewing window. For example, gaze directions of some human subjects may be weighed more than other human subjects for the positioning of the viewing window. Gaze direction of human subjects may be weighed differently based on identity of the human subjects, distance of the human subjects from the image capture device (e.g., gaze direction of closer human subjects weighed more/less gaze direction of farther human subjects), size of the human subjects depicted within the visual content (gaze direction of human subjects with larger depiction weighed more/less than gaze direction of human subjects with smaller depiction), and/or other information. For instance, the gaze directions of human subjects within a threshold distance of the image capture device may be considered for the positioning of the viewing window while the gaze directions of human subjects beyond the threshold distance of the image capture device may be disregarded for the positioning of the viewing window.

In some implementations, moments (e.g., points in time, durations of time) in the progress length of the video may be identified for inclusion in a presentation of the visual content based on the convergence of the gaze directions of multiple human subjects. For example, based on more than a threshold number of gaze directions converging to a point or a region on the visual content at a moment in the progress length of the video, the moment may be identified as a highlight moment for inclusion in a presentation of the visual content on the electronic display 14 and/or in a video clip. The convergence of the gaze direction may be used to identify both where and when within the video something of interest is happening.

The presentation component 110 may be configured to effectuate presentation of the visual content (e.g., spherical visual content) on one or more electrical displays (e.g., the electronic display 14). Effectuating presentation of the visual content on an electronic display may include causing, bringing about, facilitating, and/or otherwise effectuating presentation of the visual content on the electronic display. Effectuating presentation of the visual content on an electronic display may include showing a view of the visual content on the electronic display, generating/storing a video clip for playback on the electronic display, and/or otherwise effectuating the presentation of the visual content on the electronic display.

The presentation of the visual content may be effectuated based on the viewing window and/or other information. The presentation of the visual content may include presentation of one or more punchouts of the visual content. One or more punchouts of the visual content may be presented to provide views of one or more different spatial parts of the visual content. A punchout of the visual content may be presented based on a viewing window and/or other information. The presentation of the visual content may include the extent of the visual content within the viewing window. The presentation of the visual content may include playback of the audio content of the video. In some implementations, different spatial parts of the video may be associated with different directions of spatial audio, and the directions of the spatial audio corresponding to the punched out extents of the visual content may be played in the presentation.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

While the implementations of the disclosure are described with respect to the system 10, this is merely as an example and is not meant to be limiting. In some implementation, some or all of the functionalities attributed herein to the system 10 may be performed by another system, one or more computing devices, and/or one or more processing apparatuses (e.g., tangible hardware/equipment that processes information). In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11, the electronic storage 13, and the electronic display 14 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, Li-Fi communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of the computer program components may provide more or less functionality than is described. For example, one or more of the computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
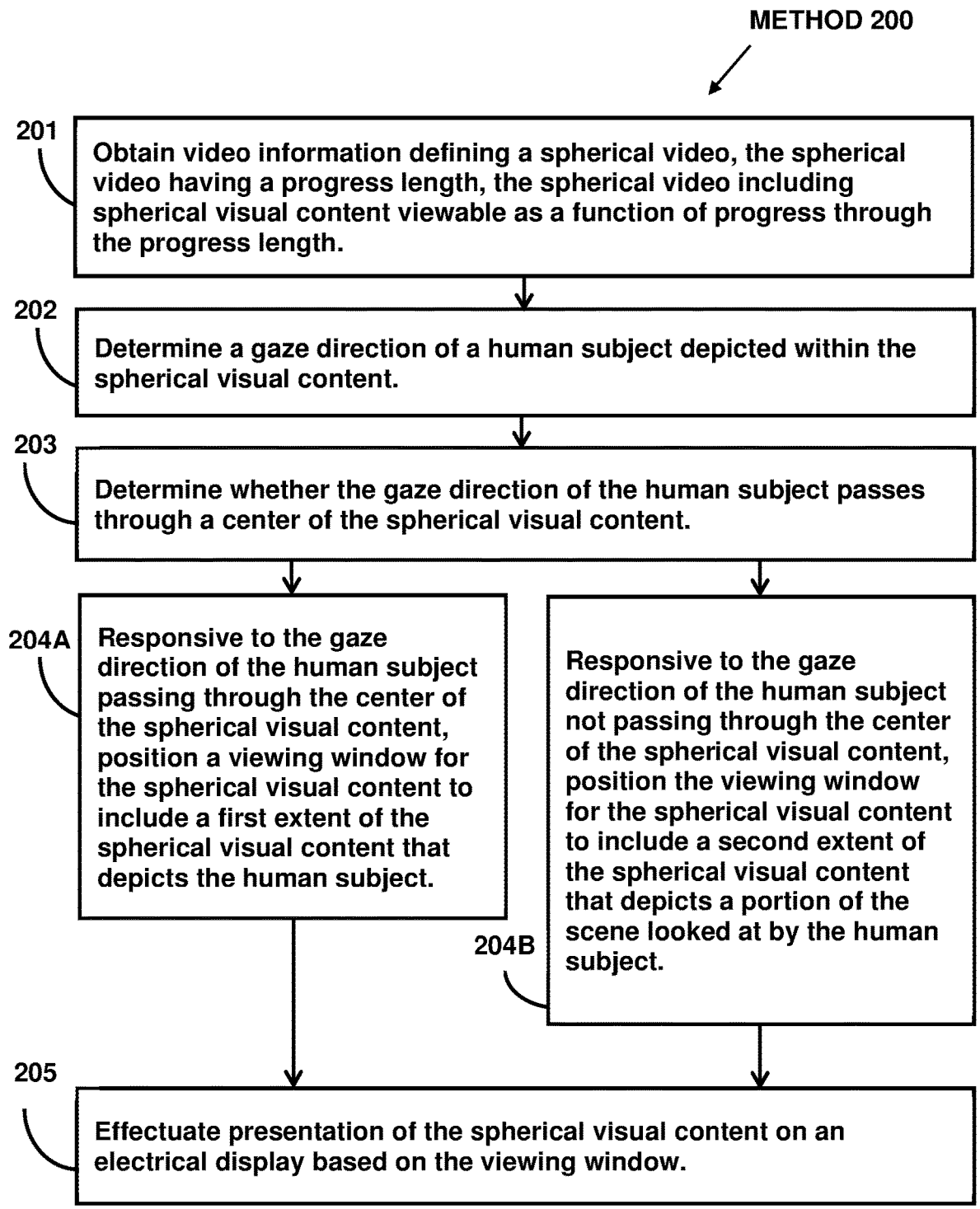
FIG. 2 illustrates an example method for framing videos.

FIG. 2 illustrates method 200 for framing videos. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 201, video information and/or other information may be obtained. The video information may define a spherical video. The spherical video may have a progress length. The spherical video may include spherical visual content viewable as a function of progress through the progress length. The spherical visual content may depict a scene including a human subject. In some implementations, operation 201 may be performed by a processor component the same as or similar to the video component 102 (Shown in FIG. 1 and described herein).

At operation 202, a gaze direction of the human subject depicted within the spherical visual content may be determined. In some implementations, operation 202 may be performed by a processor component the same as or similar to the gaze direction component 104 (Shown in FIG. 1 and described herein).

At operation 203, whether the gaze direction of the human subject passes through a center of the spherical visual content may be determined. In some implementations, operation 203 may be performed by a processor component the same as or similar to the center component 106 (Shown in FIG. 1 and described herein).

At operation 204A, responsive to the gaze direction of the human subject passing through the center of the spherical visual content, a viewing window for the spherical visual content may be positioned to include an extent of the spherical visual content that depict the human subject. In some implementations, operation 204A may be performed by a processor component the same as or similar to the viewing window component 108 (Shown in FIG. 1 and described herein).

At operation 204B, responsive to the gaze direction of the human subject not passing through the center of the spherical visual content, the viewing window for the spherical visual content may be positioned to include an extent of the spherical visual content that depict a portion of the scene looked at by the human subject. In some implementations, operation 204B may be performed by a processor component the same as or similar to the viewing window component 108 (Shown in FIG. 1 and described herein).

At operation 205, presentation of the spherical visual content on an electrical display based on the viewing window and/or other information may be effectuated. In some implementations, operation 205 may be performed by a processor component the same as or similar to the presentation component 110 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for framing videos, the system comprising:
one or more physical processors configured by machine-readable instructions to:
obtain video information defining a spherical video, the spherical video having a progress length, the spherical video including spherical visual content viewable as a function of progress through the progress length, the spherical visual content depicting a scene including a human subject;
determine a gaze direction of the human subject depicted within the spherical visual content;
determine whether the gaze direction of the human subject passes through a center of the spherical visual content;
responsive to the gaze direction of the human subject passing through the center of the spherical visual content, position a viewing window for the spherical visual content to include a first extent of the spherical visual content that depicts the human subject;
responsive to the gaze direction of the human subject not passing through the center of the spherical visual content, position the viewing window for the spherical visual content to include a second extent of the spherical visual content that depicts a portion of the scene looked at by the human subject, wherein the portion of the scene looked at by the human subject is determined based location of a head/face of the human subject depicted within the spherical visual content and the gaze direction of the human subject, the location of the head/face of the human subject depicted within the spherical visual content defined by a horizontal location angle and a vertical location angle, the gaze direction of the human subject defined by a horizontal gaze angle and a vertical gaze angle; and
effectuate presentation of the spherical visual content on an electrical display based on the viewing window.

2. The system of claim 1, wherein:
the spherical visual content depicts multiple human subjects;
responsive to a threshold number of gaze directions of the multiple human subjects converging to a point or a region on the spherical visual content, the viewing window for the spherical visual content is positioned to include a third extent of the spherical visual content that depicts a portion of the scene including the point or the region on the spherical visual content; and
responsive to the threshold number of gaze directions of the multiple human subjects not converging to the point or the region on the spherical visual content, the viewing window for the spherical visual content is positioned to include a fourth extent of the spherical visual content that depicts the multiple human subjects.

3. A system for framing videos, the system comprising:
one or more physical processors configured by machine-readable instructions to:
obtain video information defining a spherical video, the spherical video having a progress length, the spherical video including spherical visual content viewable as a function of progress through the progress length, the spherical visual content depicting a scene including a human subject;
determine a gaze direction of the human subject depicted within the spherical visual content;
determine whether the gaze direction of the human subject passes through a center of the spherical visual content;
responsive to the gaze direction of the human subject passing through the center of the spherical visual content, position a viewing window for the spherical visual content to include a first extent of the spherical visual content that depicts the human subject;
responsive to the gaze direction of the human subject not passing through the center of the spherical visual content, position the viewing window for the spherical visual content to include a second extent of the spherical visual content that depicts a portion of the scene looked at by the human subject; and
effectuate presentation of the spherical visual content on an electrical display based on the viewing window.

4. The system of claim 3, wherein:
the spherical visual content depicts multiple human subjects; and
responsive to a threshold number of gaze directions of the multiple human subjects converging to a point or a region on the spherical visual content, the viewing window for the spherical visual content is positioned to include a third extent of the spherical visual content that depicts a portion of the scene including the point or the region on the spherical visual content.

5. The system of claim 4, wherein responsive to the threshold number of gaze directions of the multiple human subjects not converging to the point or the region on the spherical visual content, the viewing window for the spherical visual content is positioned to include a fourth extent of the spherical visual content that depicts the multiple human subjects.

6. The system of claim 4, wherein the threshold number includes a majority of the multiple human subjects.

7. The system of claim 4, wherein the threshold number includes a plurality of the multiple human subjects.

8. The system of claim 3, wherein the portion of the scene looked at by the human subject is determined based location of a head/face of the human subject depicted within the spherical visual content and the gaze direction of the human subject.

9. The system of claim 8, wherein the location of the head/face of the human subject depicted within the spherical visual content is defined by a horizontal location angle and a vertical location angle.

10. The system of claim 9, wherein the gaze direction of the human subject is defined by a horizontal gaze angle and a vertical gaze angle.

11. The system of claim 10, wherein the portion of the scene looked at by the human subject is determined based on the horizontal location angle, the vertical location angle, the horizontal gaze angle, and the vertical gaze angle.

12. A method for framing videos, the method performed by a computing system including one or more processors, the method comprising:
obtaining, by the computing system, video information defining a spherical video, the spherical video having a progress length, the spherical video including spherical visual content viewable as a function of progress through the progress length, the spherical visual content depicting a scene including a human subject;
determining, by the computing system, a gaze direction of the human subject depicted within the spherical visual content;
determining, by the computing system, whether the gaze direction of the human subject passes through a center of the spherical visual content;
responsive to the gaze direction of the human subject passing through the center of the spherical visual content, positioning, by the computing system, a viewing window for the spherical visual content to include a first extent of the spherical visual content that depicts the human subject;
responsive to the gaze direction of the human subject not passing through the center of the spherical visual content, positioning, by the computing system, the viewing window for the spherical visual content to include a second extent of the spherical visual content that depicts a portion of the scene looked at by the human subject; and
effectuating, by the computing system, presentation of the spherical visual content on an electrical display based on the viewing window.

13. The method of claim 12, wherein:
the spherical visual content depicts multiple human subjects; and
responsive to a threshold number of gaze directions of the multiple human subjects converging to a point or a region on the spherical visual content, the viewing window for the spherical visual content is positioned to include a third extent of the spherical visual content that depicts a portion of the scene including the point or the region on the spherical visual content.

14. The method of claim 13, wherein responsive to the threshold number of gaze directions of the multiple human subjects not converging to the point or the region on the spherical visual content, the viewing window for the spherical visual content is positioned to include a fourth extent of the spherical visual content that depicts the multiple human subjects.

15. The method of claim 13, wherein the threshold number includes a majority of the multiple human subjects.

16. The method of claim 13, wherein the threshold number includes a plurality of the multiple human subjects.

17. The method of claim 12, wherein the portion of the scene looked at by the human subject is determined based location of a head/face of the human subject depicted within the spherical visual content and the gaze direction of the human subject.

18. The method of claim 17, wherein the location of the head/face of the human subject depicted within the spherical visual content is defined by a horizontal location angle and a vertical location angle.

19. The method of claim 18, wherein the gaze direction of the human subject is defined by a horizontal gaze angle and a vertical gaze angle.

20. The method of claim 19, wherein the portion of the scene looked at by the human subject is determined based on the horizontal location angle, the vertical location angle, the horizontal gaze angle, and the vertical gaze angle.

* * * * *